(12) United States Patent
Askeland et al.

(10) Patent No.: US 6,935,714 B2  
(45) Date of Patent: Aug. 30, 2005

(54) VARIABLE MAPPING OF NOZZLE ROWS TO DECREASE DOT PLACEMENT ARTIFACTS OF AN INKJET PRINTHEAD

(75) Inventors: Ronald A. Askeland, San Diego, CA (US); James A. Feinn, San Diego, CA (US); David D. Helfrick, San Diego, CA (US); Jason R. Arbeiter, Poway, CA (US); Jason Quintana, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 147 days.

(21) Appl. No.: 10/448,970

(22) Filed: May 30, 2003

(65) Prior Publication Data

US 2004/0239707 A1 Dec. 2, 2004

(51) Int. Cl.⁷ .............................................. B41J 29/393
(52) U.S. Cl. .................................. 347/9; 347/15; 347/19
(58) Field of Search ............................. 347/15, 43, 19, 347/14, 9, 71, 46

(56) References Cited

U.S. PATENT DOCUMENTS 6,543,880 B1 * 4/2003 Akhavain et al. ............. 347/42

* cited by examiner

Primary Examiner—Lamson Nguyen

(57) ABSTRACT

The present invention includes as one embodiment an inkjet printing method for decreasing dot placement artifacts of a thermal inkjet printhead having at least one substrate having nozzle rows each associated with a print data row, the method including variably mapping each nozzle row to a print data row based on a swath height error of the substrate to reduce the artifacts caused by the swath height error.

43 Claims, 7 Drawing Sheets

VARIABLE MAPPING OF NOZZLE ROWS TO DECREASE DOT PLACEMENT ARTIFACTS OF AN INKJET PRINTHEAD

BACKGROUND OF THE INVENTION

Accurate dot placement of ink droplets on a print media with an inkjet printer influences the quality of images printed on the print media. One problem that comprises accurate dot placement is swath height errors of the inkjet printhead. Swath height errors are commonly produced by mechanical defects in the substrate of the printhead and can produce erroneous dot placement artifacts in the media scan axis.

To solve this problem, a variety of methods have been used to compensate for artifacts in the media scan axis. For example, one method included adjusting the media advance to match the swath height error of the particular printhead. With this approach, the selection of a single media advance correction scheme is applied to all printheads in the system.

However, this can be problematic in multi-printhead systems that have printheads with varying swath height errors. For example, in a particular printing system with multiple printheads, a first printhead may have a negative swath height error of 21 μm, while a second printhead may have a positive swath height error of 15 μm, and a third printhead may have no error at all. In this case, the single advance correction scheme will not correct the swath height errors for the entire printing system, but only one of the printheads.

In addition, a single advance correction may change the scaling factor of the image, which could have negative implications for line art drawing applications, such as printouts for computer aided design applications.

SUMMARY OF THE INVENTION

The present invention includes as one embodiment an inkjet printing method for decreasing dot placement artifacts of a thermal inkjet printhead having at least one substrate having nozzle rows each associated with a print data row, the method comprising variably mapping each nozzle row to a print data row based on a swath height error of the substrate to minimize the artifacts caused by the swath height error.

BRIEF DESCRIPTION OF THE DRAWINGS

The present invention can be further understood by reference to the following description and attached drawings that illustrate the preferred embodiments. Other features and advantages will be apparent from the following detailed description of the preferred embodiment, taken in conjunction with the accompanying drawings, which illustrate, by way of example, the principles of the invention.

FIGS. 7A–7D illustrate working examples of the operation of several embodiments of the present invention.

FIGS. 8A–8D illustrate a working examples of the operation of a multi-substrate printhead that incorporates an embodiment of the present invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1:
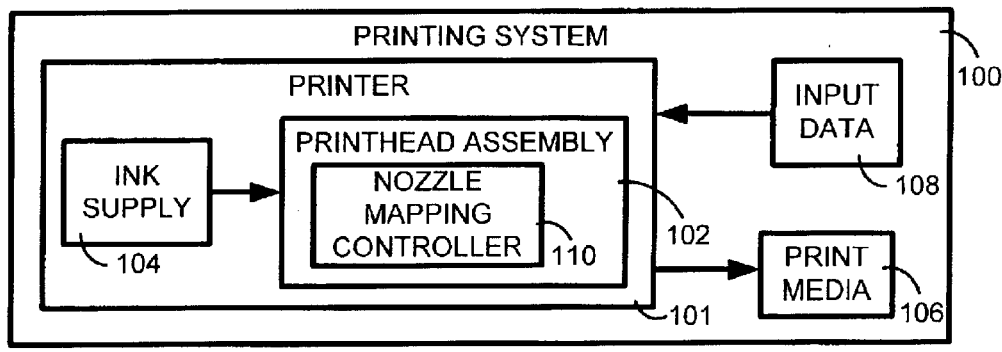
FIG. 1 shows a block diagram of an overall printing system incorporating one embodiment of the present invention.

I. General Overview:

FIG. 1 shows a block diagram of an overall printing system incorporating one embodiment of the present invention. The printing system 100 of one embodiment of the present invention includes a printhead assembly 102, ink supply or ink reservoir 104 and print media 106. At least one printhead assembly 102 and ink reservoir 104 are typically included in a printer 101. Input data 108 is sent to the printing system 100 and includes, among other things, information about the print job.

In addition, the printhead assembly 102 includes a nozzle mapping controller 110, which may be implemented as firmware and/or hardware incorporated into the printer in a master controller device (not shown), or physically integrated with the printhead assembly 102 as a printhead controller device. Also, the controller 110 can be implemented by a printer driver as software operating on a computer system (not shown) that is connected to the printer 101 or a processor (not shown) that is physically integrated with the printhead assembly 102. The printhead assembly 102 further includes at least one substrate (not shown), such as a semiconductor wafer or die. The printhead assembly 102 may be comprised of a single substrate or multiple substrates. Also, the printing system can include multiple printhead assemblies for a wide page array printer, each with at least one substrate.

Each substrate or die includes ink ejection elements and associated ejection chambers for releasing the ink through corresponding nozzles or orifices in respective adjacent nozzle members. A single nozzle mapping controller 110 can control all substrates in a printhead assembly 102, or each substrate can have its own nozzle mapping controller disposed thereon that is synchronized with the other nozzle mapping controllers.

For a multiple substrate printing system, the substrates are preferably located adjacent to one another with overlapping and non-overlapping regions existing between each adjacent substrate. The nozzle mapping controller 110 is operatively connected to the ink ejection elements of each substrate and receives and processes input data 108 to decrease dot placement artifacts by variably mapping each nozzle row to a print data row based on a swath height error of the substrate (discussed in detail below) to minimize the artifacts caused by the swath height errors, thereby improving image quality.

In general, the nozzle mapping controller 110 determines the firing order of the nozzles in a single substrate or multiple substrates. The location of a dot produced by a nozzle can be changed in a column or row, by changing the time at which the respective nozzles are fired. As such, the particular nozzles being fired to form a specified row of dots may be altered to correct for identified negative or positive swath height errors. For multiple substrates or multiple printhead assemblies, a nozzle mapping correction scheme is applied for each substrate to maintain proper scaling of a printed image.

Figure 2:
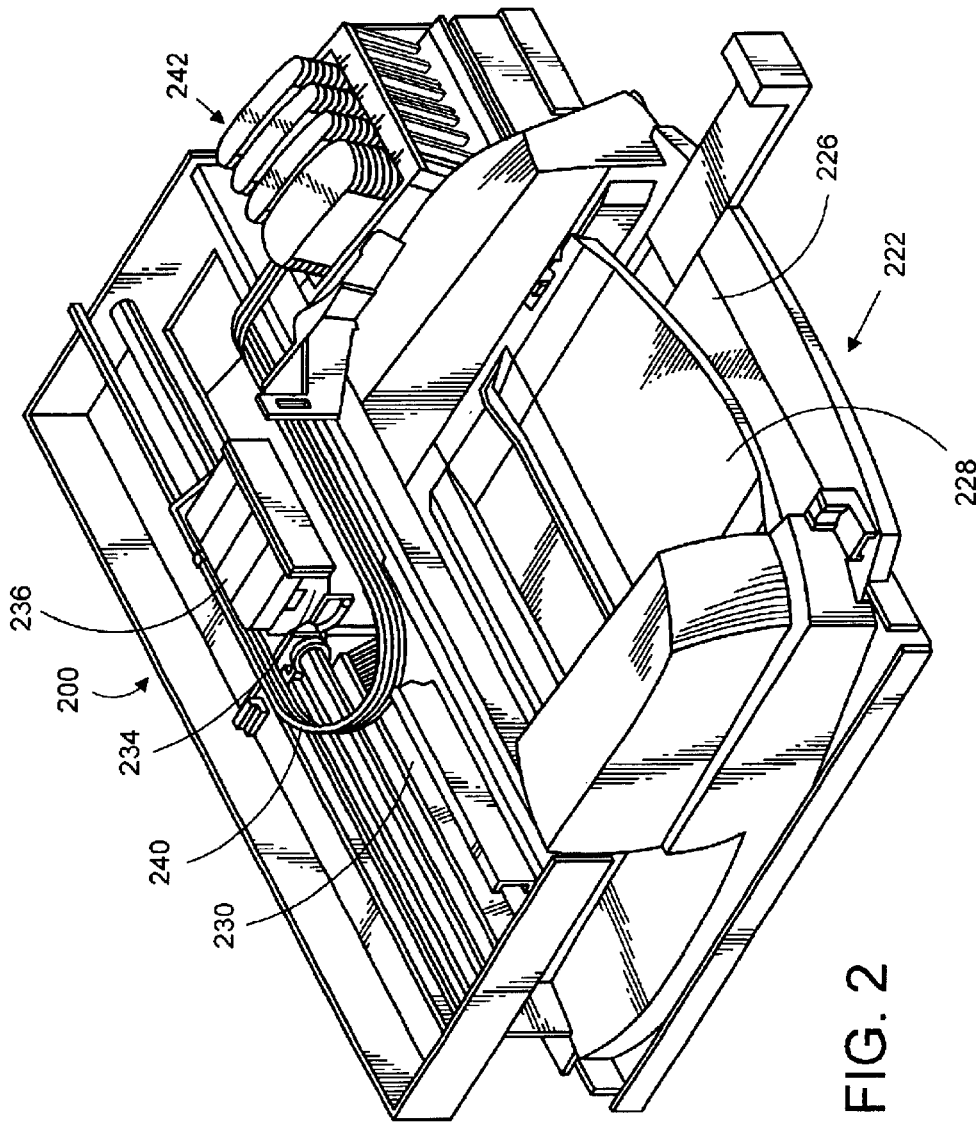
FIG. 2 is an exemplary printer usable with the system of FIG. 1 that incorporates one embodiment of the invention and is shown for illustrative purposes only.

II. Exemplary Printing System:

FIG. 2 is an exemplary embodiment of a printer that incorporates a multi-substrate or multi-die module for a single printhead assembly according to an embodiment of the invention and is shown for illustrative purposes only. As discussed above, other printers, such as a wide page array printer with multiple single-substrate printhead assemblies can incorporate embodiments of the present invention.

Generally, printer 200, which is shown in FIG. 2 as one type of printer 101 of FIG. 1, can incorporate the printhead assembly 102 of FIG. 1 and further include a tray 222 for holding print media. When printing operation is initiated, print media, such as paper, is fed into printer 200 from tray 222 preferably using sheet feeder 226. The sheet is then brought around in a U direction and then travels in an opposite direction toward output tray 228. Other paper paths, such as a straight paper path, can also be used.

The sheet is stopped in a print zone 230, and a scanning carriage 234, supporting one or more printhead assemblies 236, is scanned across the sheet for printing a swath of ink thereon. After a single scan or multiple scans, the sheet is then incrementally shifted using, for example a stepper motor or feed rollers to a next position within the print zone 230. Carriage 234 again scans across the sheet for printing a next swath of ink. The process repeats until the entire sheet has been printed, at which point it is ejected into the output tray 228.

The print assemblies 236 can be removeably mounted or permanently mounted to the scanning carriage 234. Also, the printhead assemblies 236 can have self-contained ink reservoirs which provide the ink supply 104 of FIG. 1. Alternatively, each print cartridge 236 can be fluidically coupled, via a flexible conduit 240, to one of a plurality of fixed or removable ink containers 242 acting as the ink supply 104 of FIG. 1.

Figure 3:
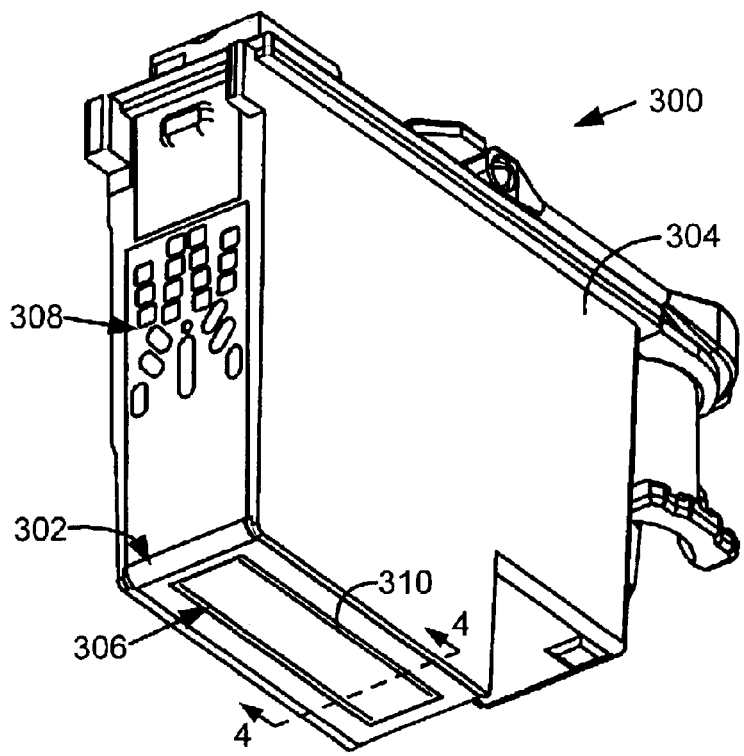
FIG. 3 shows for illustrative purposes only a perspective view of an exemplary print cartridge usable with the printer of FIG. 2 incorporating one embodiment of the printhead assembly of the present invention.

FIG. 3 shows for illustrative purposes only a perspective view of an exemplary print cartridge 300 (an example of the printhead assembly 102 of FIG. 1) that incorporates one embodiment of the invention and is shown for illustrative purposes only. A detailed description of the present invention follows with reference to a typical print cartridge used with a typical printer, such as printer 200 of FIG. 2. However, the embodiments of the present invention can be incorporated in any printhead and printer configuration.

Referring to FIGS. 1 and 2 along with FIG. 3, the print cartridge 300 is comprised of a thermal head assembly 302 and a body 304. The thermal head assembly 302 can be a flexible material commonly referred to as a Tape Automated Bonding (TAB) assembly. The thermal head assembly 302 contains a nozzle member 306 to which the plural substrates are attached to form the printhead assembly 102.

Thermal head assembly 302 also has interconnect contact pads (not shown) and is secured to the printhead assembly 300 with suitable adhesives. Contact pads 308 align with and electrically contact electrodes (not shown) on carriage 234. The nozzle member 306 preferably contains plural parallel rows of offset nozzles 310 for each substrate through the thermal head assembly 306 created by, for example, laser ablation. Other nozzle arrangements can be used, such as non-offset parallel rows of nozzles.

Figure 4:
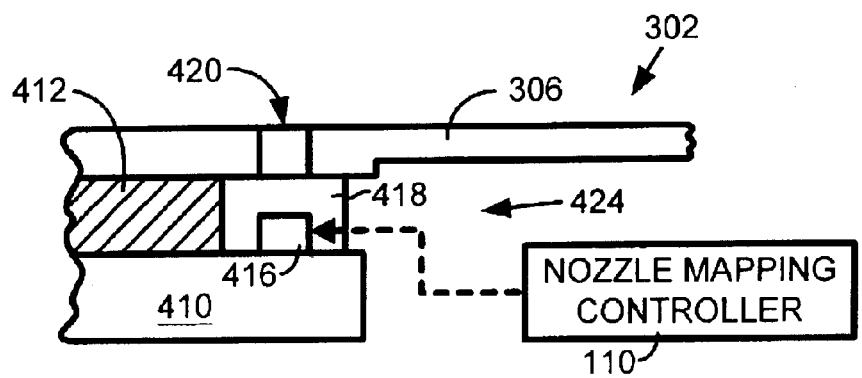
FIG. 4 is a schematic cross-sectional view taken through a portion of section line 4—4 of FIG. 3 showing a portion of the ink chamber arrangement of an exemplary printhead substrate in the print cartridge of FIGS. 1 and 3.

III. Component Details:

FIG. 4 is a cross-sectional schematic taken through a portion of section line 4—4 of FIG. 3 of the print cartridge 300 utilizing one embodiment of the present invention. A detailed description of one embodiment of the present invention follows with reference to a typical print cartridge 300. However, embodiments of the present invention can be incorporated in any printhead configuration. Also, the elements of FIG. 4 are not to scale and are exaggerated for simplification.

Referring to FIGS. 1–3 along with FIG. 4, in general, the thermal head assembly 302 includes at least one substrate 410 (a single substrate is shown in FIG. 4 for simplicity) and a barrier layer 412 located between the nozzle member 306 and each substrate 410 for insulating conductive elements from the substrate 410, and for forming a plurality of ink ejection chambers 418 (one of which is shown). For the embodiment with plural substrates, the plural substrates are located adjacent to one another with overlapping and non-overlapping regions existing between each substrate.

Also included is a corresponding plurality of ink ejection elements 416 disposed on the substrate 410. The nozzle mapping controller 110 is operatively connected to the ink ejection elements 416. Each chamber 418 is associated with a different one of the ink ejection elements 416. The nozzle mapping controller 110 receives print data and processes the print data to decrease dot placement artifacts by variably mapping each nozzle row to a print data row based on a swath height of the substrate to minimize the artifacts caused by swath height errors, thereby improving image quality.

An ink ejection or vaporization chamber 418 is adjacent each ink ejection element 416 of each substrate 410, as shown in FIG. 4, so that each ink ejection element 416 is located generally behind a single orifice or nozzle 420 of the nozzle member 306. Thus, each ink ejection element 416 is associated with, and ejects ink from, a corresponding nozzle 420. The nozzles 420 are shown in FIG. 4 to be located near an edge of the substrate 410 for illustrative purposes only. The nozzles 420 can be located in other areas of the nozzle member 306, such as centered between an edge of the substrate 410 and an interior side of the body 304.

The ink ejection elements 416 may be resistor heater elements or piezoelectric elements, but for the purposes of the following description, the ink ejection elements may be referred to as resistor heater elements. In the case of resistor heater elements, each ink ejection element 416 acts as an ohmic heater when selectively energized by one or more pulses applied sequentially or simultaneously to one or more of the contact pads via the integrated circuit. The orifices 420 may be of any size, number, and pattern, and the various figures are designed to simply and clearly show the features of one embodiment of the invention. The relative dimensions of the various features have been greatly adjusted for the sake of clarity.

Figure 5:
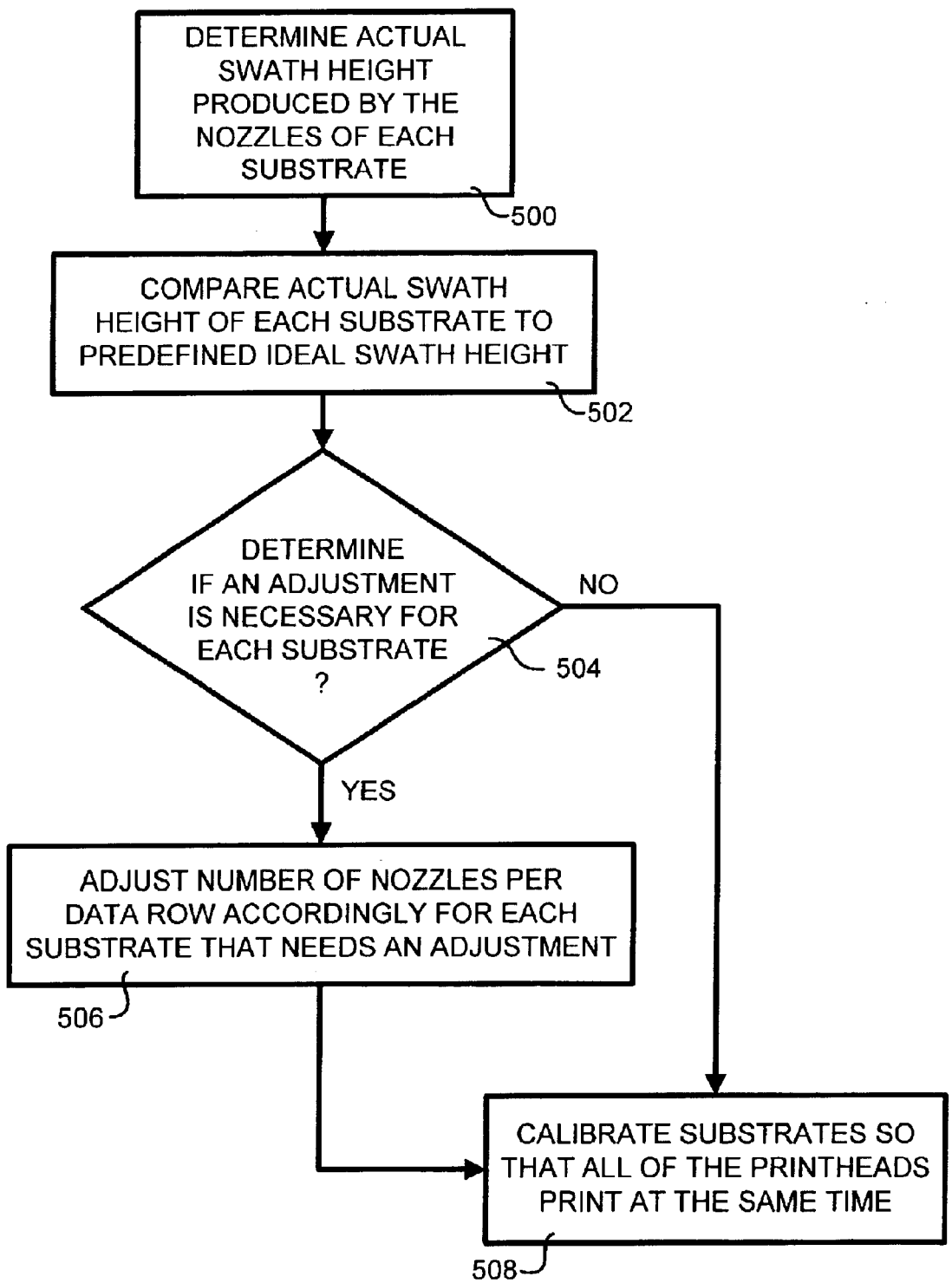
FIG. 5 is a flow diagram of the operation of a printhead assembly according to FIG. 3 that incorporates an embodiment of the present invention.
Figure 6:
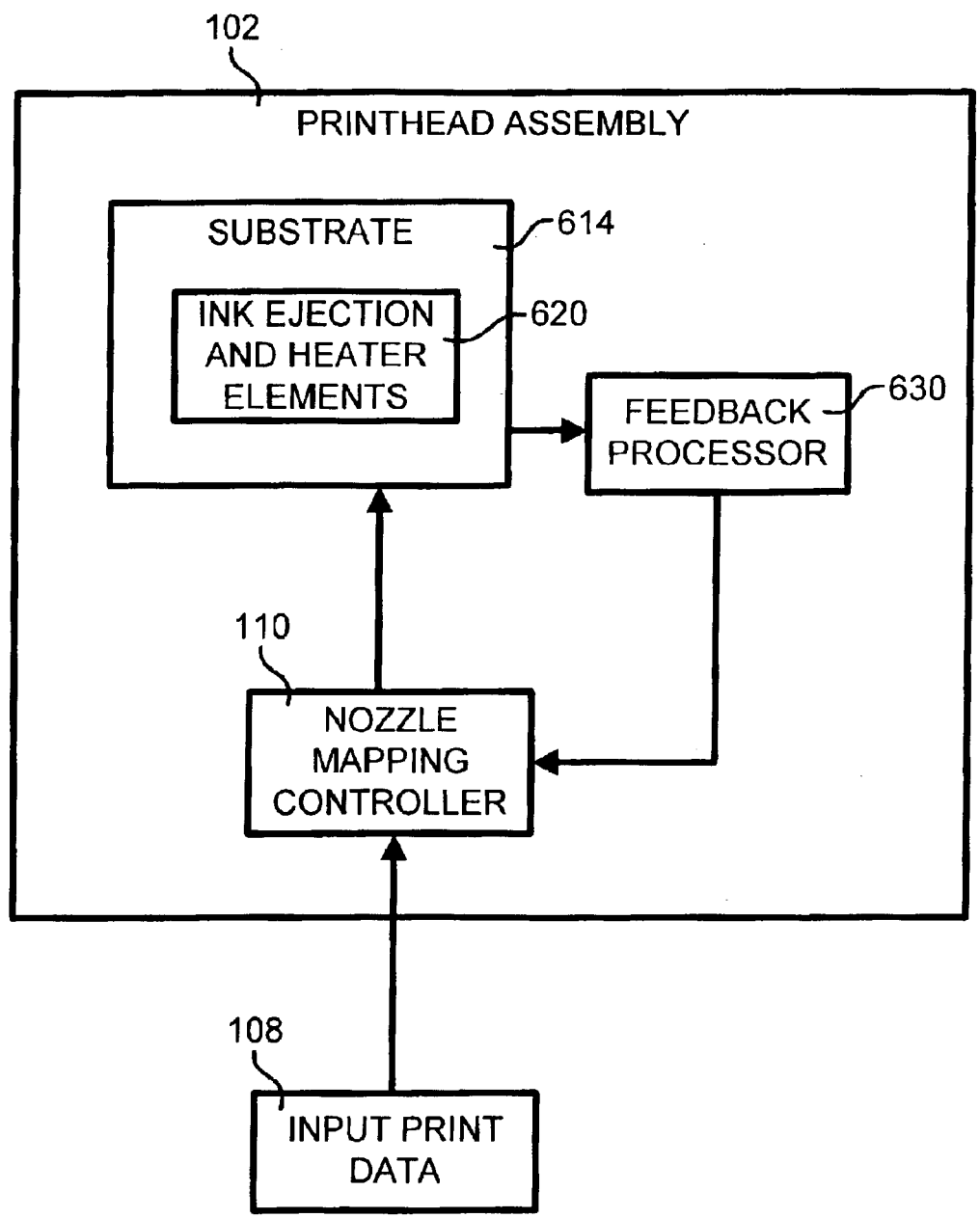
FIG. 6 is a block diagram of a printhead assembly according to FIG. 3 that incorporates an embodiment of the present invention.

FIG. 5 is a flow diagram of the operation of a printhead assembly according to FIG. 3 that incorporates an embodiment of the present invention. FIG. 6 is a block diagram of a printhead assembly according to FIG. 3 that incorporates an embodiment of the present invention. Referring to FIG. 6 along with FIG. 5, first, an actual swath height produced by each substrate 614 when printing dots is determined (step 500). This can be accomplished with an optical system with a feedback processor 630 that examines and analyzes the dots printed on the print media with an optical system with a feedback processor 630.

For example, the feedback processor 630 can have an internal scanning device for examining and analyzing in real time the dots as they leave the substrate and before they land on the print media. Alternatively, the feedback processor 630 can have an external scanning device for examining the dots after they have been printed on the print media. Further, although FIG. 6 shows a feedback processor 630 and a nozzle mapping controller 110 incorporated in each printhead 102, a single feedback processor 630 and a single nozzle mapping controller 110 can be external devices to each printhead and can be used to analyze and control all printheads.

Second, the actual swath height of each substrate 614 is compared to a predefined ideal swath height (step 502). The predefined ideal swath height is a theoretical swath height that is chosen by the manufacturer that will produce consistent and accurate ink drops. Third, it is determined whether an adjustment is necessary (based on the severity of the swath height error) for each substrate based on a predefined unit (step 504).

In one embodiment, the unit is nozzle spacing and if the difference between the actual swath height and the ideal swath height is less than or equal to ½ unit, then the adjustment is not performed, where 1 unit is equal to the spacing between consecutive nozzles for all columns. However, if the difference between the actual swath height and the ideal swath height is greater than ½ unit, then the adjustment is performed. The feedback processor 630 calculates the swath height error (which could be a negative or positive error) by comparing the actual swath height to the theoretical swath height. A negative swath height error occurs when the actual swath height is less than the ideal swath height, while a positive swath height error occurs when the actual swath height is greater than the ideal swath height.

Fourth, if an adjustment is deemed appropriate, the number of nozzles per data row (for firing purposes of the ink ejection and heater elements 620) is adjusted by the nozzle mapping controller 110 according to a predefined relationship for each substrate that needs an adjustment (step 506). In the embodiment above where the difference is calculated in nozzle spacing units, if the difference is negative, the nozzles per data row are increased by 1 from the nominal value for the same number of data rows as the difference in swath height.

In contrast, if the difference is positive, the nozzles per data row are decreased by 1 from the nominal value for the same number of data rows as the difference in swath height. For example, if the difference is negative two (−2) and the nominal value of the nozzles per data row is four (4), then the nozzles per data row are increased to five (5) for the two (2) data rows. Last, the substrates are calibrated so that all of the printheads print at the same time (step 508).

In one embodiment, the predefined relationship of step 506 is defined by the following expression:

$$T = \left(\sum_{n=1}^{a} R_n\right) - \left(\sum_{n=1}^{a-1} D_n\right)$$

$$R = \sum_{p=1}^{\beta} \left[\frac{\theta(p)}{p}\right]$$

where T is the total height (in data rows) of each printhead, R is the height of each individual substrate, D is the height of the overlap region between substrates, where α is equal to the total number of substrates, where $\theta_{(p)}$ is equal to the number of nozzles with p nozzles per data row and where β equals the number of nozzles per data row.

In the above expression, the total height T of the printhead 102 (in data rows) is equal to the sum of the length of each individual substrate minus the overlap region between substrates. The height R of an individual substrate (in data rows) is equal to the sum of the number of nozzles with "p" nozzles per data rows divided by p, for p=1 to β. The value of p can be adjusted for selected nozzles of a given substrate to get the correct value for T. It should be noted that T, R and D are all measured in data rows.

In one example using the above expression, the swath height could be calculated from the height of a nozzle column, z, and a height of nozzle overlap, y. In the case of an exemplary four-substrate module, where each nozzle column is the same height and the nozzle overlap is equal, the swath height would equal 4z−3y.

Figures 7A, 7B, 7C, 7D:
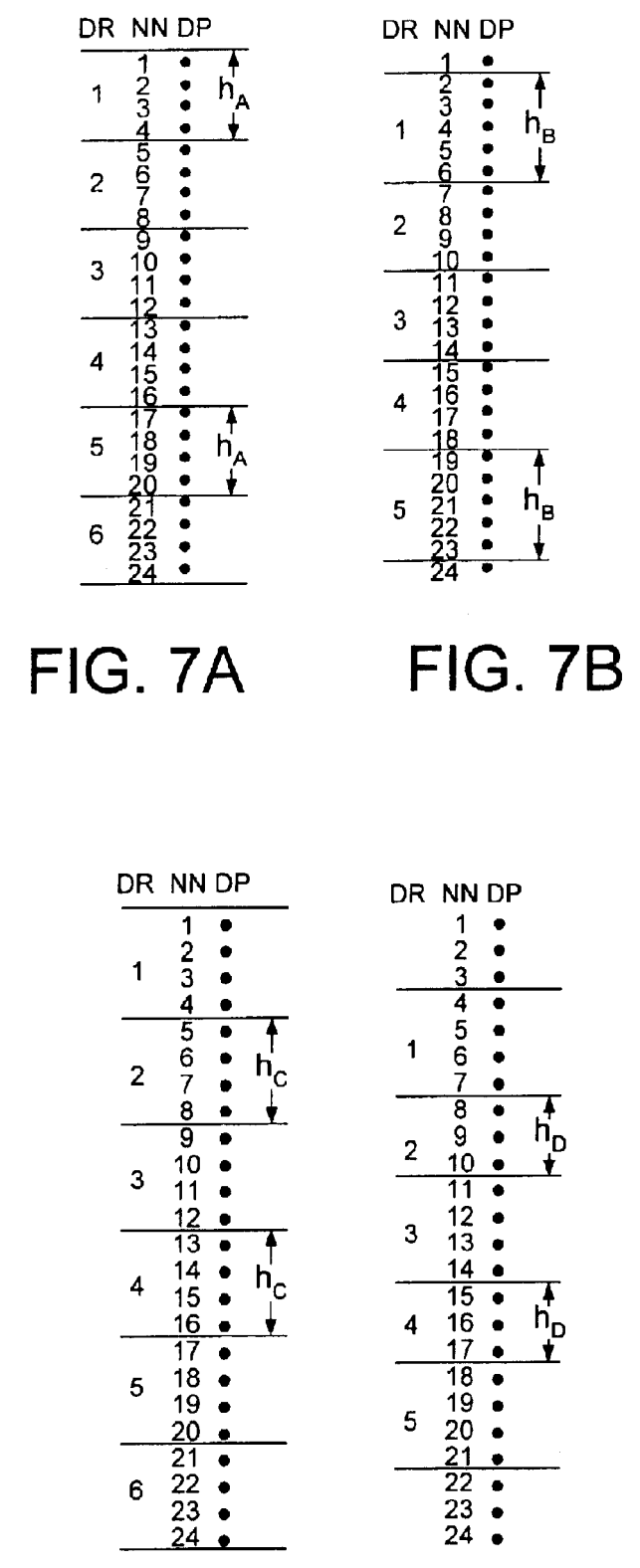

FIGS. 7A–7D illustrate working examples of several embodiments of the present invention. FIGS. 7A–7D each illustrate data mapping of a substrate with 2400 nozzles per inch that prints 600 dots per inch data. For illustrative purposes, each substrate is shown with a data row (DR), nozzle number (NN) and dot position (DP). FIGS. 7A and 7C each illustrate data mapping of a substrate with 24 nozzles before the nozzle mapping controller 110 of FIG. 1 is activated. The substrate of FIG. 7A has a negative swath height error and the substrate of FIG. 7C has a positive swath height error. FIGS. 7B and 7D each illustrate data mapping of the substrates of FIGS. 7A and 7C, respectively, after the nozzle mapping controller 110 of FIG. 1 is activated.

In general, the negative swath height error of FIG. 7A is corrected by printing most of the data rows with 4 nozzle rows and printing a few of the data rows with 5 nozzle rows. The positive swath height error of FIG. 7C is corrected by printing most of the data rows with 4 nozzle rows and printing a few of the data rows with 3 nozzle rows. Thus, the purpose of the nozzle mapping controller 110 of FIG. 1 is to remap the data rows so that more nozzles are used to print a given number of some data rows in order to correct negative swath height errors and fewer nozzles are used to print a given number of some data rows in order to correct positive swath height errors.

As a working illustration, it is assumed that the substrate of FIG. 7A has a swath height error of −21 μm and the substrate of FIG. 7C has a swath height error of +21 μm. In both cases, when 4 nozzle rows are used to print each data row, there is a 21 μm swath height mismatch at the ends of the swath. The nozzle mapping controller 110 corrects the swath height errors in FIGS. 7A and 7C by variably mapping nozzle rows to data rows. Namely, as shown in FIG. 7B, the negative swath height error of FIG. 7A is corrected by using 5 nozzles per data row for 2 of the 5 data rows. As a result, the height $h_B$ of the 5 data rows of the corrected swath is larger than the height $h_A$ of the 5 data rows of the uncorrected swath having negative swath height error. As shown in FIG. 7D, the positive swath height error of FIG. 7C is corrected by using 3 nozzles per data row for 2 of the 5 data rows. As a result, the height $h_D$ of the 5 data rows of the corrected swath is smaller than the height $h_C$ of the 5 data rows of the uncorrected swath having positive swath height error.

Figures 8A, 8B:
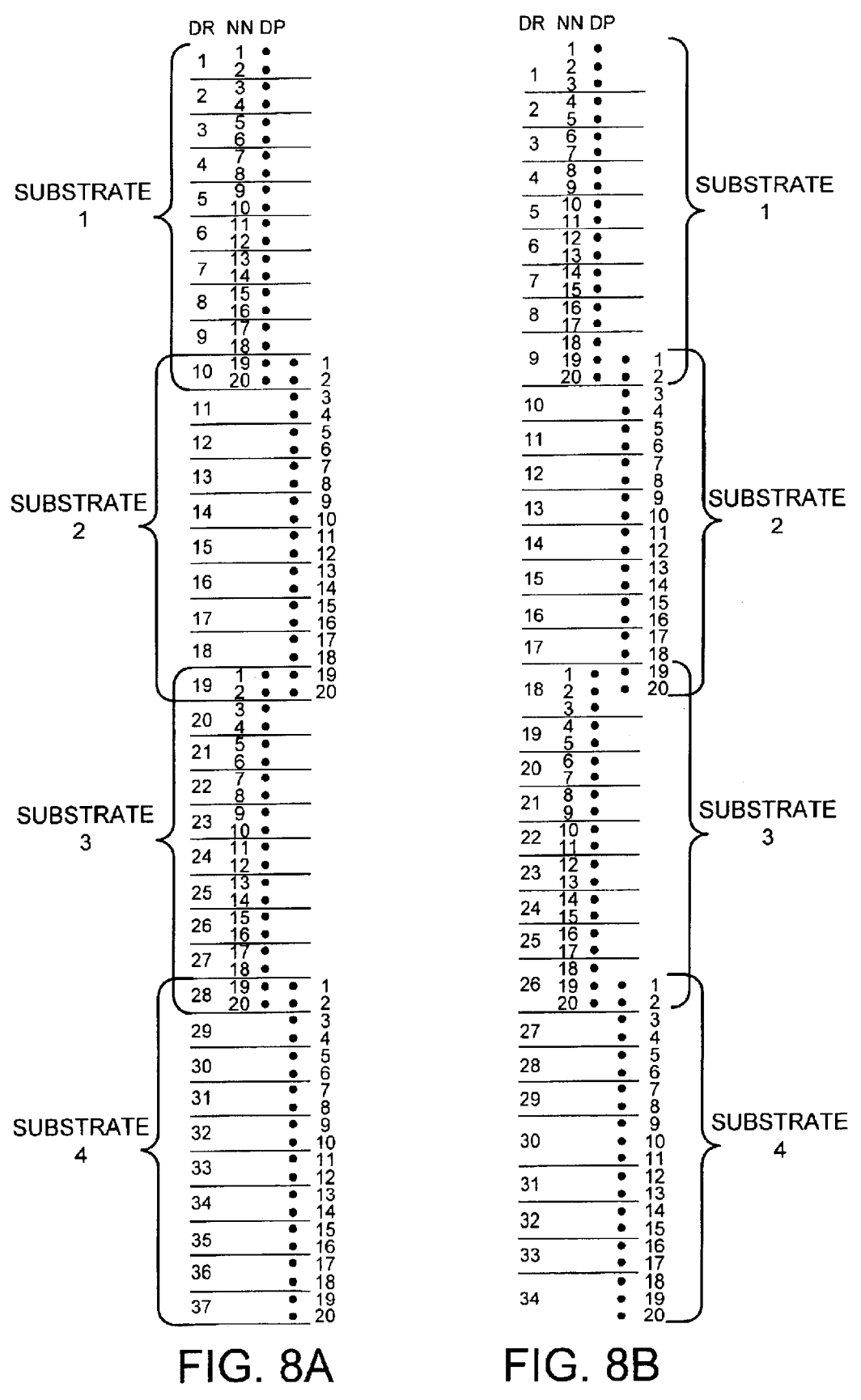
Figures 8C, 8D:
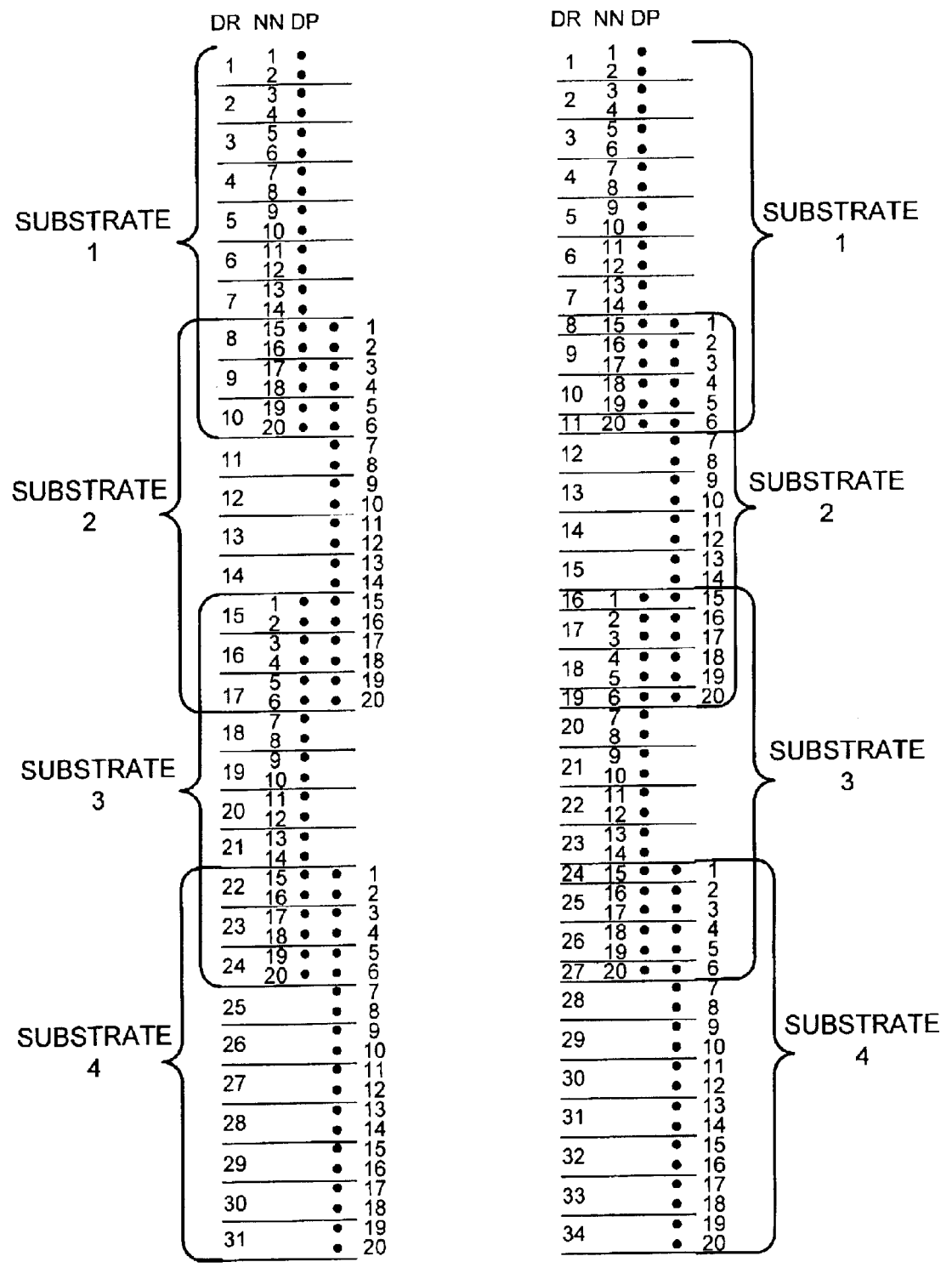

FIGS. 8A–8D illustrate working examples of printhead assemblies that incorporate embodiments of the present invention. FIGS. 8A–8D each show multi-substrate printhead assemblies, each having 4 substrates with 20 nozzles, and is shown for illustrative purposes only. Each substrate is shown with a data row (DR), nozzle number (NN) and dot position (DP). FIGS. 8A and 8C illustrate data mapping of a respective substrate with 20 nozzles before the nozzle mapping controller 110 of FIG. 1 is activated. The substrate of FIG. 8A has a negative swath height error and the substrate of FIG. 8C has a positive swath height error. FIGS. 8B and 8D each illustrate data mapping of the substrates of FIGS. 8A and 8C, respectively, after the nozzle mapping controller 110 of FIG. 1 is activated.

In the examples of FIGS. 8A–8D, the swath height could be calculated from the height of the nozzle column, and the height of the nozzle overlap. The swath height would equal 4 nozzle column minus 3 nozzle overlaps for an exemplary 4 substrate module, where each nozzle column is the same height and the nozzle overlap is equal. As two nozzles are printed per row, the nominal height of the column of each substrate is 10 data rows and the nominal overlap of nozzles is 4 nozzles. The ideal swath height would have a total of 34 data rows to allow 1200 dpi printed with the multi-substrate module.

In one example, assuming the multi-substrate module of FIG. 8A has an uncorrected swath height error of −73 $\mu$m with 37 data rows, each having 2 nozzle rows and 2 dot positions per data row in non-overlapping areas and 4 nozzle rows and 4 dot positions per data row in overlapping regions. The corrected swath height error is shown in FIG. 8B and is corrected by the feedback processor 630 of FIG. 6, which determines the amount of negative swath height error, and the nozzle mapping controller 110 of FIG. 1, which variably maps some of the nozzle rows to data rows to effectively shift the data rows based on the amount of swath height error that is detected. The method of FIG. 5 can be used to variably map some of the nozzle rows to data rows to remap the data rows to an ideal 34 data rows for this example.

Namely, for substrate 1, the first data row (data row 1) and the last data row in the overlap region with substrate 2 (data row 9) includes an additional nozzle row and dot position (3 nozzle rows for substrate 1 instead of 2). Similarly, for substrate 3, the first data row (after adjustment, now data row 18) and the last data row in the overlap region with substrate 4 (after adjustment, now data row 26) includes an additional nozzle row and dot position (3 nozzle rows for substrate 3 instead of 2). In addition, for substrate 4, the last data row (after adjustment, now data row 34) includes an additional nozzle row and dot position (3 nozzle rows instead of 2). This variably mapping allows the data rows of the multi-substrate module to be reduced from 37 data rows of FIG. 8A to 34 data rows of FIG. 8B, thereby reducing the swath height error of the multi- module to only −12 $\mu$m.

For positive swath height errors, the multi-substrate module of FIG. 8C has an uncorrected swath height error of +87 $\mu$m with only 31 data rows, each having 2 nozzle rows and 2 dot positions per data row in non-overlapping areas and 6 nozzle rows and 6 dot positions per data row in overlapping regions. The corrected swath height error is shown in FIG. 8D and is corrected by the feedback processor 630 of FIG. 6, which determines the amount of positive swath height error, and the nozzle mapping controller 110 of FIG. 1, which variably maps some of the nozzle rows to data rows to effectively shift the data rows based on the amount of swath height error that is detected. The method of FIG. 5 can be used to variably map some of the nozzle rows to data rows to remap the data rows to an ideal 34 data rows for this example.

Specifically, for substrate 1, the first data row in the overlap region with substrate 2 (data row 8) loses a nozzle row and dot position per substrate (1 nozzle row for each substrate instead of 2 for each) and the last data row in the overlap region with substrate 2 (data row 11) loses a nozzle row and dot position per substrate (1 nozzle row for each substrate instead of 2 each). Similarly, for substrate 2, the first data row in the overlap region with substrate 3 (data row 16) loses a nozzle row and dot position per substrate (1 nozzle row for each substrate instead of 2 each) and the last data row in the overlap region with substrate 3 (data row 17) loses a nozzle row and dot position per substrate (1 nozzle row for each substrate instead of 2 each).

In addition, for substrate 3, the first data row in the overlap region with substrate 4 (data row 24) loses a nozzle row and dot position per substrate (1 nozzle row for each substrate instead of 2 each) and the last data row in the overlap region with substrate 4 (data row 27) loses a nozzle row and dot position per substrate (1 nozzle row for each substrate instead of 2 each). To preserve nozzle redundancy, mapping of a data row to a single row is done in the substrate overlap region. This variably mapping allows the data rows of the multi-substrate module to be increased from 31 data rows of FIG. 8C to 34 data rows of FIG. 8D, thereby reducing the swath height error of the multi-module to only 16 $\mu$m.

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for decreasing dot placement artifacts of a thermal inkjet printhead having at least one substrate having nozzle rows each associated with a print data row, the method comprising:
   variably mapping each nozzle row to a print data row based on a swath height error of the substrate to reduce the artifacts caused by the swath height error.

2. The method of claim 1, wherein the mapping further comprises adjusting the nozzle rows per data row if a difference between an actual swath height and an ideal swath height is greater than ½ of a nozzle spacing unit, wherein 1 nozzle spacing unit is equal to a spacing between adjacent nozzles.

3. The method of claim 2, further comprising increasing the nozzles per data row by 1 from a nominal value of the data rows for a same number of data rows as the difference in swath height if the actual swath height is less than the ideal swath height.

4. The method of claim 2, further comprising decreasing the nozzles per data row by 1 from a nominal value for a same number of data rows as the difference in swath height if the actual swath height is greater than the ideal swath height.

5. The method of claim 1, further comprising variably mapping each nozzle row to a print data row based on a swath height error of multiple substrates forming printhead modules.

6. The method of claim 5, further comprising calibrating the substrates so that all the printhead modules print at the same time.

7. The method of claim 1, further comprising determining an actual swath height produced by the substrate.

8. The method of claim 7, further comprising comparing the actual swath height of the substrate to a predefined ideal swath height to define the swath height error.

9. The method of claim 7, further comprising adjusting the nozzle rows that are mapped to the data rows based on a predefined unit.

10. An inkjet printing system, comprising:
a substrate with a plurality of ink ejection elements, each ink ejection element coupled to a corresponding one of a plurality of ink ejection chambers for ejecting ink through a corresponding one of a plurality of nozzles, each nozzle for printing in a corresponding one of a plurality of nozzle rows; and
a mapping controller operatively connected to the ink ejection elements, the controller receiving and processing print data to variably map at least one nozzle row to a print data row based on a swath height error of the substrate.

11. The inkjet printing system of claim 10, wherein the mapping controller is physically integrated with the substrate.

12. The inkjet printing system of claim 10, wherein the mapping controller is implemented as firmware incorporated into the inkjet printing system.

13. The inkjet printing system of claim 10, wherein the mapping controller is implemented by a printer driver as software operating on a computer system that is connected to the inkjet printing system.

14. The inkjet printing system of claim 10, wherein the mapping controller is implemented by a processor that is physically integrated with the substrate.

15. The inkjet printing system of claim 10, wherein the inkjet printing system includes plural substrates.

16. The inkjet printing system of claim 15, wherein the plural substrates form multiple single substrate printhead modules.

17. The inkjet printing system of claim 16, wherein the plural substrates form a single printhead module.

18. The inkjet printing system of claim 16, wherein the plural substrates form multiple single substrate printhead modules and a single printhead module.

19. The inkjet printing system of claim 10, further comprising a feedback processor operatively coupled to the substrate and the mapping controller that determines an actual swath height produced by the substrate.

20. The inkjet printing system of claim 19, wherein the feedback processor is an optical system that examines dots printed on print media by the inkjet printing system.

21. The inkjet printing system of claim 20, wherein the optical system is an internal scanning device that analyzes in real time the dots as they leave the substrate and before they land on the print media.

22. The inkjet printing system of claim 20, wherein the optical system is an external scanning device that examines the dots after they have been printed on the print media.

23. The inkjet printing system of claim 19, wherein the feedback processor compares the actual swath height of each substrate to a predefined ideal swath height.

24. The inkjet printing system of claim 23, wherein the swath height error is adjusted if a difference between the actual swath height and the ideal swath height is greater than ½ of a nozzle spacing unit, wherein 1 nozzle spacing unit is equal to a spacing between consecutive nozzles.

25. The inkjet printing system of claim 24, if the difference is negative, the nozzles per data row are increased by 1 from a nominal value of the data rows for a same number of data rows as the difference in swath height.

26. The inkjet printing system of claim 24, if the difference is positive, the nozzles per data row are decreased by 1 from a nominal value for a same number of data rows as the difference in swath height.

27. The inkjet printing system of claim 24, wherein the inkjet printhead includes plural substrates and wherein the swath height error is adjusted in accordance with the expression:

$$T = \left(\sum_{n=1}^{a} R_n\right) - \left(\sum_{n=1}^{a-1} D_n\right)$$

$$R = \sum_{p=1}^{\beta} \left[\frac{\theta(p)}{p}\right]$$

where T is a total height of each printhead, R is a height of each individual substrate, D is a height of an overlap region between substrates, where $\alpha$ is equal to a total number of substrates, where $\theta_{(p)}$ is equal to a number of nozzles with p nozzles per data row and where $\beta$ equals a number of nozzles per data row.

28. An inkjet printhead assembly having a plurality of substrates with plural ink ejection elements, each ink ejection element having a heating element, and the substrate having nozzle rows each associated with a print data row, the inkjet printhead comprising:
means for determining a swath height error of the substrate; and
means for variably mapping each nozzle row to a print data row based on the swath height error of the substrate to reduce the artifacts caused by the swath height error.

29. The inkjet printhead of claim 28, wherein the inkjet printhead assembly includes plural substrates.

30. The inkjet printhead of claim 29, wherein the plural substrates form multiple single substrate printhead modules.

31. The inkjet printhead of claim 29, wherein the plural substrates form a single printhead module.

32. The inkjet printhead of claim 29, wherein the plural substrates form multiple single substrate printhead modules and a single printhead module.

33. An method for operating an inkjet printhead having at least one substrate with plural ink ejection elements, each ink ejection element associated with a corresponding nozzle, the method comprising:
determining an actual swath height produced by the substrate;
comparing the actual swath height to a predefined ideal swath height to define a swath height error; and
variably mapping each nozzle to a print data row based on the swath height error of the substrate to reduce the swath height error.

34. The method of claim 33, further comprising adjusting the mapping of nozzles to the print data rows if the comparison yields a difference between the actual swath height and the ideal swath height that is greater than ½ of a nozzle spacing unit, wherein 1 nozzle spacing unit is equal to a spacing between adjacent nozzles.

35. The method of claim 34, wherein, if the difference is negative, the adjusting includes increasing the nozzles per data row by 1 from a nominal value of the data rows for a same number of data rows as the difference in swath height.

36. The method of claim 33 wherein, if the difference is positive, the adjusting includes decreasing the nozzles per data row by 1 from a nominal value for a same number of data rows as the difference in swath height.

37. The method of claim 33, wherein the inkjet printhead includes plural substrates that form multiple single substrate printhead modules and further comprising calibrating all of the substrates so that all the printhead modules print at the same time.

38. The method of claim 33, wherein the inkjet printhead includes plural substrates that form a single printhead module and further comprising calibrating all of the substrates so that all the printhead modules print at the same time.

39. The method of claim 33, wherein the inkjet printhead includes plural substrates that form multiple single substrate printhead modules and a single printhead module and further comprising calibrating all of the substrates so that all the printhead modules print at the same time.

40. In a system for decreasing dot placement artifacts of a thermal inkjet printhead having at least one substrate having nozzle rows each associated with a print data row, a computer-readable medium having computer-executable instructions for performing a process on a computer, the process comprising:

variably mapping each nozzle row to a print data row based on a swath height error of the substrate to reduce the artifacts caused by the swath height error.

41. The computer-readable medium having computer-executable instructions for performing the process of claim 40, further comprising adjusting the nozzle rows per data row if a difference between an actual swath height and an ideal swath height is greater than ½ of a nozzle spacing unit, wherein 1 nozzle spacing unit is equal to a spacing between adjacent nozzles.

42. The computer-readable medium having computer-executable instructions for performing the process of claim 41, further comprising increasing the nozzles per data row by 1 from a nominal value of the data rows for a same number of data rows as the difference in swath height if the actual swath height is less than the ideal swath height.

43. The computer-readable medium having computer-executable instructions for performing the process of claim 41, further comprising decreasing the nozzles per data row by 1 from a nominal value for a same number of data rows as the difference in swath height if the actual swath height is greater than the ideal swath height.

* * * * *